United States Patent [19]

Omachi

[11] Patent Number: 5,013,184

[45] Date of Patent: May 7, 1991

[54] LOCK USING AIR CHAMBERS

[75] Inventor: Toshikatsu Omachi, Matsudo, Japan

[73] Assignees: Toshikatsu Omachi; Foundation of River & Basin Integrated Communications, Japan

[21] Appl. No.: 489,813

[22] Filed: Mar. 7, 1990

[30] Foreign Application Priority Data

Sep. 18, 1989 [JP] Japan .................................. 1-239873

[51] Int. Cl.⁵ .............................................. E02C 5/00
[52] U.S. Cl. ........................................ 405/85; 405/84; 405/3
[58] Field of Search .................................. 405/84-86, 405/115, 92, 3-5

[56] References Cited

U.S. PATENT DOCUMENTS 2,161,529  6/1939  Powers ............................ 405/85 X
2,608,827  9/1952  Cernocky ........................ 405/85
4,877,351 10/1989  Enami ............................. 405/86

FOREIGN PATENT DOCUMENTS 300928   9/1917  Fed. Rep. of Germany ........ 405/85
893778  10/1953  Fed. Rep. of Germany ........ 405/85
1237742   4/1986  U.S.S.R. ............................. 405/85

Primary Examiner—Dennis L. Taylor
Attorney, Agent, or Firm—Marger, Johsnon, McCollom & Stolowitz, Inc.

[57] ABSTRACT

A lock using lock chambers and lock gates capable of reducing the water consumption in the operations of raising or lowering the boat passing through the lock from one level to another. The lock includes flexible air chambers capable of being inflated with air, located on bases of the lock chambers which are connected by a pipe equipped with a valve for controlling a flow of air between the air chambers.

17 Claims, 11 Drawing Sheets

LOCK USING AIR CHAMBERS

BACKGROUND OF THE INVENTION

1. Field of the Invention

The present invention relates to a lock for raising and lowering boats as they pass from one level to another level in a canal, a river, or a dock, by means of lock chambers and lock gates.

2. Description of the Background Art

The Panama canal connecting the Atlantic and Pacific oceans is equipped with a multiple level lock.

Such a conventional lock in general operates as shown in FIGS. 1(A) to 1(E) sequentially.

First of all, the lock comprises a lower lock chamber 105 and an upper lock chamber 107 provided between a lower stream 101 and an upper stream 103, which are separated by a middle lock gate 111. The lower lock chamber 105 is separated from the lower stream 101 by a lower lock gate 109, and the upper lock chamber 107 is separated from the upper stream 103 by a front gate 113.

The lower stream 101 and the lower lock chamber 105 are connected at their bases by a lower pipe 115 equipped with a lower valve 117, the lower lock chamber 105 and the upper lock chamber 107 are connected at their bases by a middle pipe 119 equipped with a middle valve 121, and the upper stream 103 and the upper lock chamber 107 are connected at their bases by an upper pipe 123 equipped with an upper valve 125. Both of the lower lock chamber 105 and the upper lock chamber 107 are filled with appropriate amount of water initially.

Now, a boat K on the lower stream 101 can be raised to the upper stream 103 as follows.

First, as shown in FIG. 1(A), the lower lock gate 109 is opened, the boat K is lead from the lower stream 101 to the lower lock chamber 105, and then the lower lock gate 109 is closed. Here, the water corresponding to the displacement of the boat K is discharged from the lower lock chamber 105 into the lower stream 101.

Next, as shown in FIG. 1(B), the middle valve 121 is opened, the water is poured through the middle pipe 119 from the upper lock chamber 107 to the lower lock chamber 105 until the water level of the lower lock chamber 105 meets the water level of the upper lock chamber 107.

When the the water level of the lower lock chamber 105 meets the water level of the upper lock chamber 107, as shown in FIG. 1(C), the middle valve 121 is closed, the upper lock gate 111 is opened, the boat K is lead from the lower lock chamber 105 to the upper lock chamber 107, and then the upper lock gate 111 is closed.

Next, as shown in FIG. 1(D), the upper valve 125 is opened, the water is poured through the upper pipe 123 from the upper stream 103 to the upper lock chamber 107 until the water level of the upper lock chamber 107 reaches the water level of the upper stream 103.

When the the water level of the upper lock chamber 107 reaches the water level of the upper stream 103, as shown in FIG. 1(E), the upper valve 125 is closed, the front gate 113 is opened, the boat K is lead from the upper lock chamber 107 to the upper stream 103, and then the front gate 113 is closed. Here, the water corresponding to the displacement of the boat K flows from the upper stream 103 into the upper lock chamber 107. At the same time, the lower valve 117 is opened, and the water is discharged through the lower pipe 115 from the lower lock chamber 105 to the lower stream 101 such that the whole system returns to its initial state.

The boat K on the upper stream 103 can be lowered to the lower stream 101 by the reverse of the operation for raising the boat K just described.

Now, in the operation to raise the boat from the lower stream 101 to the upper stream 103 or the operation to lower the boat from the upper stream 103 to the lower stream 101 which uses the lock chambers such as the lower and upper lock chambers 105 and 107 above, there is a problem that in order to carry out these operations, an enormous amount of water is necessary.

In a case of Panama canal, the water resource is rather limited, and in the drier year in which the water level is low in the Gatun lake which is the upper stream for the Panama canal, limiting of the draft for the boat to pass through the canal is often necessary.

Thus, in order to cope with the increase of the passage through the canal, or in order to realize a larger lock capable of dealing with larger boats, it is indispensable to secure sufficient amount of water required for the operations at the lock, and it is preferable to reduce this amount as much as possible.

As a method of reducing the water consumption at the lock, there is a proposition to utilize horizontal water storage system for temporarily storing the water discharged from the lock chambers, so as to achieve the advantage of water saving similar to that obtainable by increasing the number of the lock chambers in the lock.

However, a number of such horizontal water storages are needed in this system to achieve a higher water consumption saving rate, and this makes the operation of the system very complicated.

SUMMARY OF THE INVENTION

It is therefore an object of the present invention to provide a lock using lock chambers and lock gates capable of reducing the water consumption in the operations of raising or lowering the boat passing through the lock from one level to another.

According to one aspect of the present invention there is provided a lock for connecting an upper stream and a lower stream, comprising: an upper lock chamber containing water, located adjacent to the upper stream; a first flexible air chamber capable of being inflated with air, located on a base of the upper lock chamber; a lower lock chamber containing water, located between the upper lock chamber and the lower stream; a second flexible air chamber capable of being inflated with air, located on a base of the lower lock chamber; and pipe means for connecting the first air chamber and the second air chamber, equipped with valve means for controlling a flow of air between the first air chamber and the second air chamber.

According to another aspect of the present invention there is provided a lock for connecting an upper stream and a lower stream, comprising: a lock chamber containing water, located between the upper stream and the lower stream; an air chamber capable of being inflated with air, located on a base of the lock chamber; a balance air chamber capable of being inflated with air, located outside of the lock chamber; and pipe means for connecting the air chamber and the balance air chamber, equipped with valve means for controlling a flow of air between the air chamber and the balance air chamber.

Other features and advantages of the present invention will become apparent from the following description taken in conjunction with the accompanying drawings.

DETAILED DESCRIPTION OF THE PREFERRED EMBODIMENTS

Figure 1A:
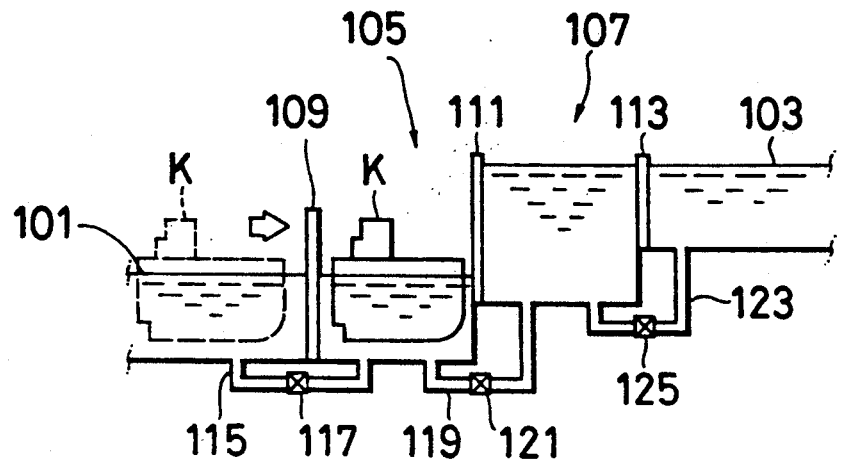
FIG. 1(A) to 1(E) are sequential longitudinal sectional views of a conventional lock for explaining its operation.
Figure 1B:
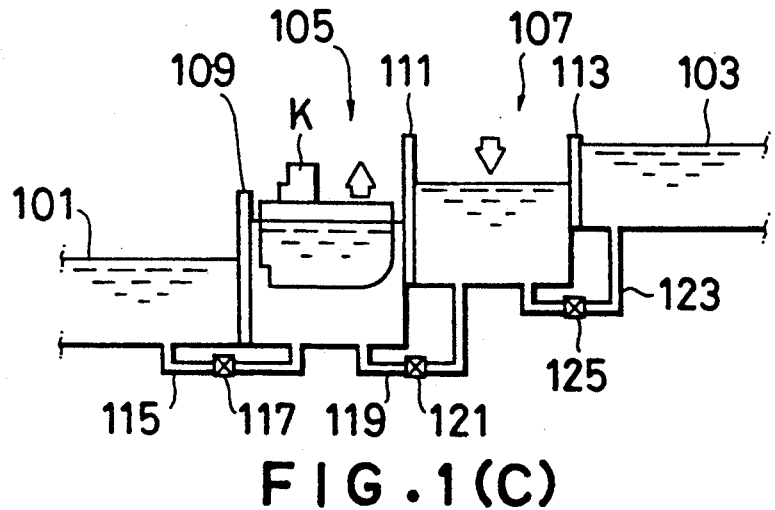
Figure 1C:
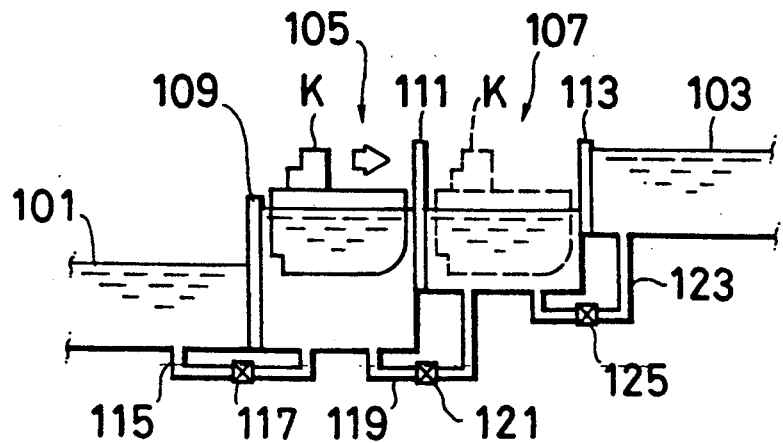
Figure 1D:
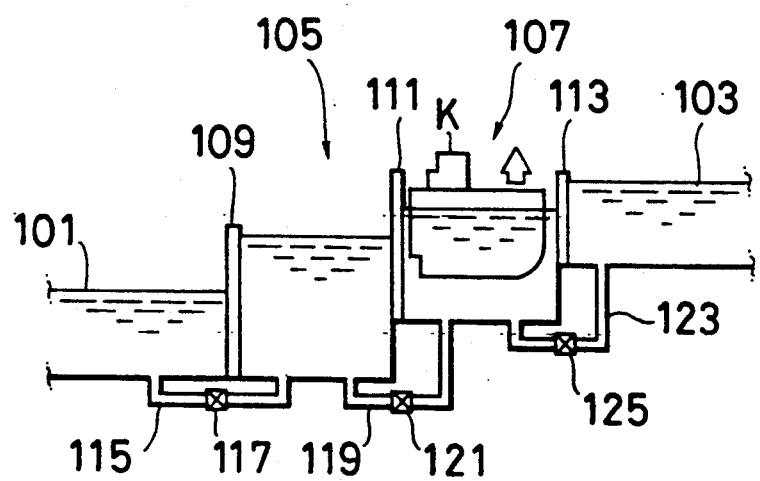
Figure 1E:
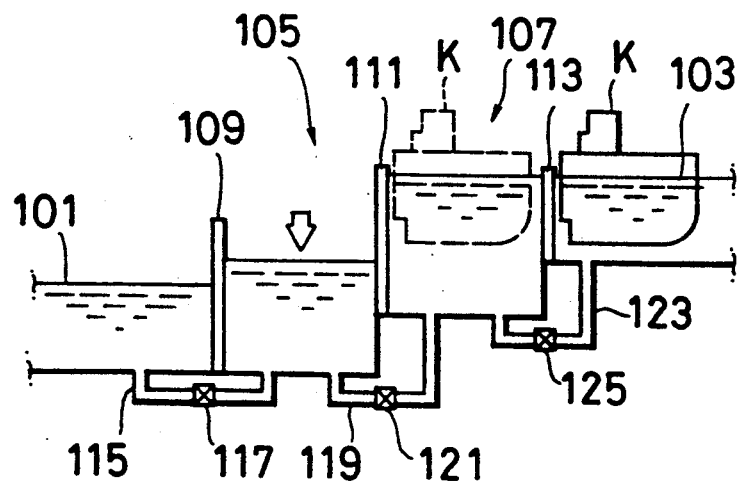
Figure 2:
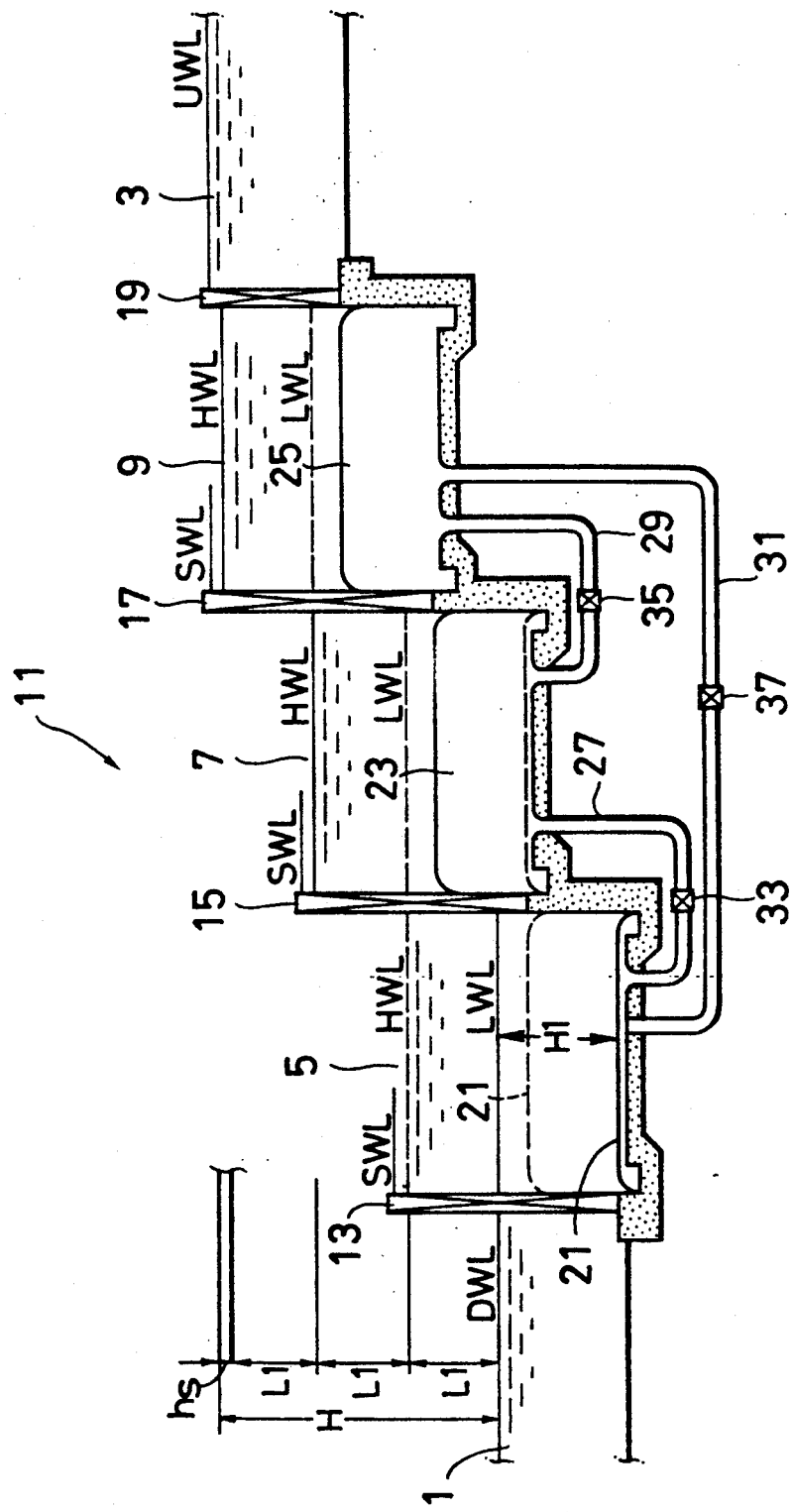
FIG. 2 is a longitudinal sectional view of one embodiment of a lock according to the present invention.

Referring now to FIG. 2, there is shown one embodiment of a lock according to the present invention.

In this embodiment, the lock 11 comprises a lower lock chamber 5, a middle lock chamber 7 and an upper lock chamber 9 provided between a lower stream 1 and an upper stream 3. The lower lock chamber 5 and the middle lock chamber 7 are separated by a middle lock gate 15, and the middle lock chamber 5 and the upper lock chamber 7 are separated by an upper lock gate 17. The lower lock chamber 5 is separated from the lower stream 1 by a lower lock gate 13, and the upper lock chamber 9 is separated from the upper stream 3 by a front gate 19.

The lower, middle, and upper lock chambers 5, 7, and 9 are equipped at their bases with lower, middle, and upper air chambers 21, 23, and 25, respectively. The lower air chamber 21 and the middle air chamber 23 are connected at their bases by a first pipe 27 equipped with a first valve 33, the middle air chamber 23 and the upper air chamber 25 are connected at their bases by a second pipe 29 equipped with a second valve 35, and the lower air chamber 21 and the upper air chamber 25 are connected at their bases by a third pipe 31 equipped with a third valve 37.

Each of the lower, middle, and upper air chambers 21, 23, and 25 is made of an air shell for confining airs within. This configuration is designed such that the inflation of deflation of the air shells of the lower, middle, and upper air chambers 21, 23, and 25 is performed by means of water weight differences in the lower, middle, and upper lock chambers 5, 7, and 9, and is controlled by means of the first, second, and third valves 33, 35, and 37.

In FIG. 2, a water level of the lower stream 1 is designated by DWL, a water level of the upper stream 3 is designated by UWL, high and low water levels in each of the lower, middle, and upper lock chambers 5, 7, and 9 are designated by HWL and LWL, respectively. and a surcharge water level for each of the lower, middle, and upper lock chambers 5, 7, and 9 is designated by SWL. Also, a height difference between the lower stream 1 and the upper stream 3 is designated by H, a lift of each lock chamber is designated by L, and a surcharge water level difference is designated by hs. Here, obviously, L=(H−hs)/3 holds. Also, the minimum water depth for each of the lower, middle, and upper lock chambers 5, 7, and 9 is designated by H1.

In this embodiment, a boat K on the lower stream 1 can be raised to the upper stream 3 as follows.

Figure 3A:
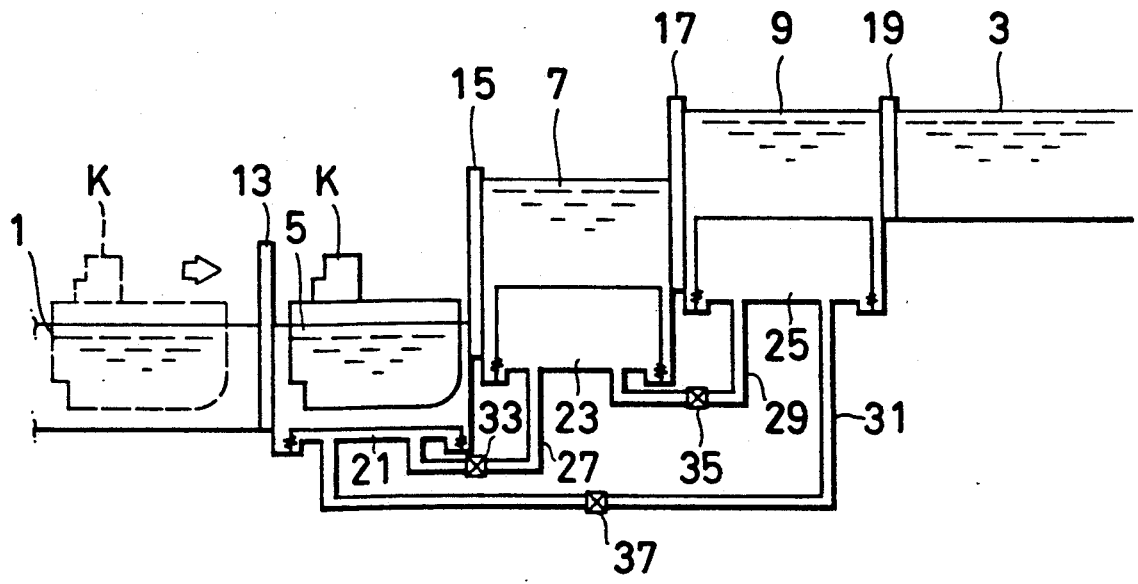
FIG. 3(A) to 3(G) are sequential longitudinal sectional views of a lock of FIG. 2 for explaining its operation.

First, as shown in FIG. 3(A), the lower lock gate 13 is opened, the boat K is lead from the lower stream 1 to the lower lock chamber 5, and then the lower lock gate 13 is closed. Here, the water depth of the lower lock chamber 5 is H1, while the water depth of the middle lock chamber 7 is H1+hs.

Figure 3B:
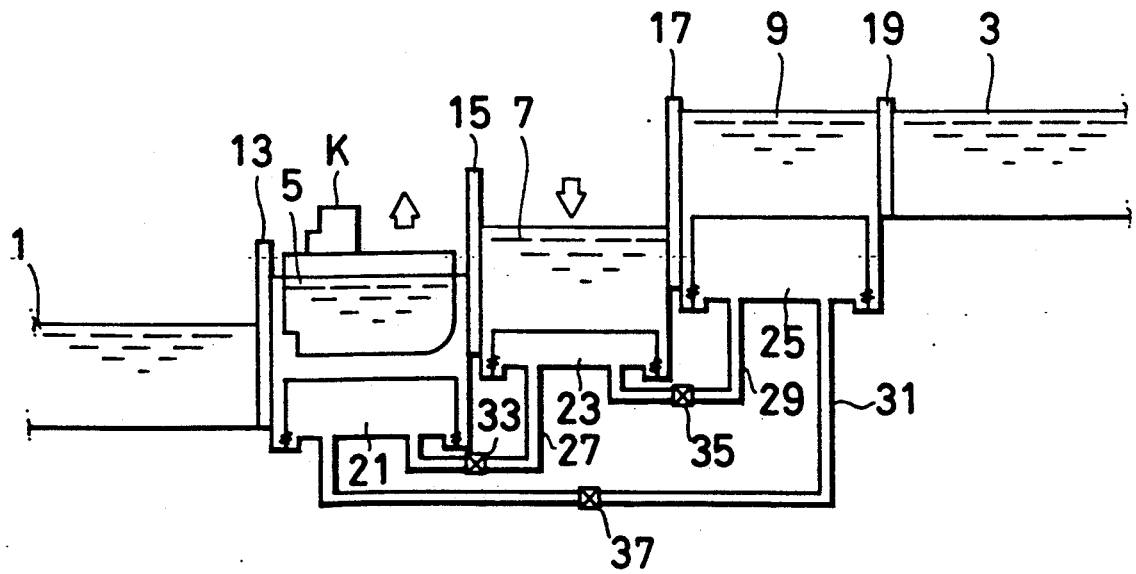

At this point, the first valve 33 is opened such that the air in the middle air chamber 23 flows into the lower air chamber 21 through the first pipe 27. As a result, the water level of the lower lock chamber 5 is raised while the water level of the middle lock chamber 7 is lowered, as shown in FIG. 3(B).

Figure 3C:
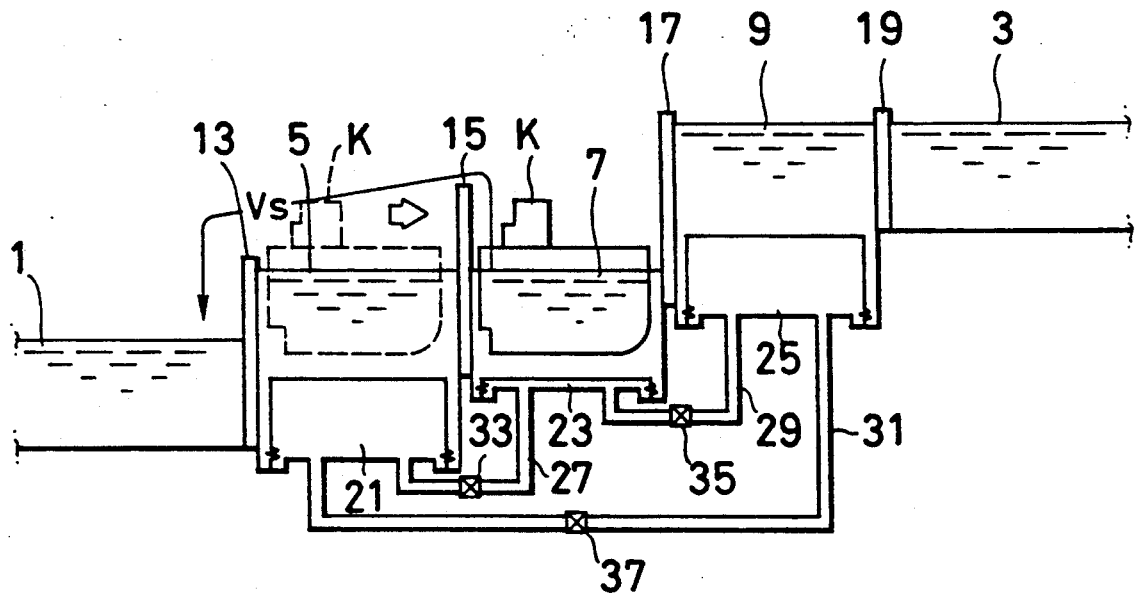

Next, as shown in FIG. 3(C), the first valve 33 is closed, and the surcharge water Vs is discharged from the middle lock chamber 7 to the lower stream 1, such that the water levels of the lower lock chamber 5 and the middle lock chamber 7 are at the same level. Then, the middle lock gate 15 is opened, the boat K is lead from the lower lock chamber 5 to the middle lock chamber 7, and the middle lock gate is closed. Here, the water depth of the middle lock chamber 7 is H1, while the water depth of the upper lock chamber 9 is H1+hs.

Figure 3D:
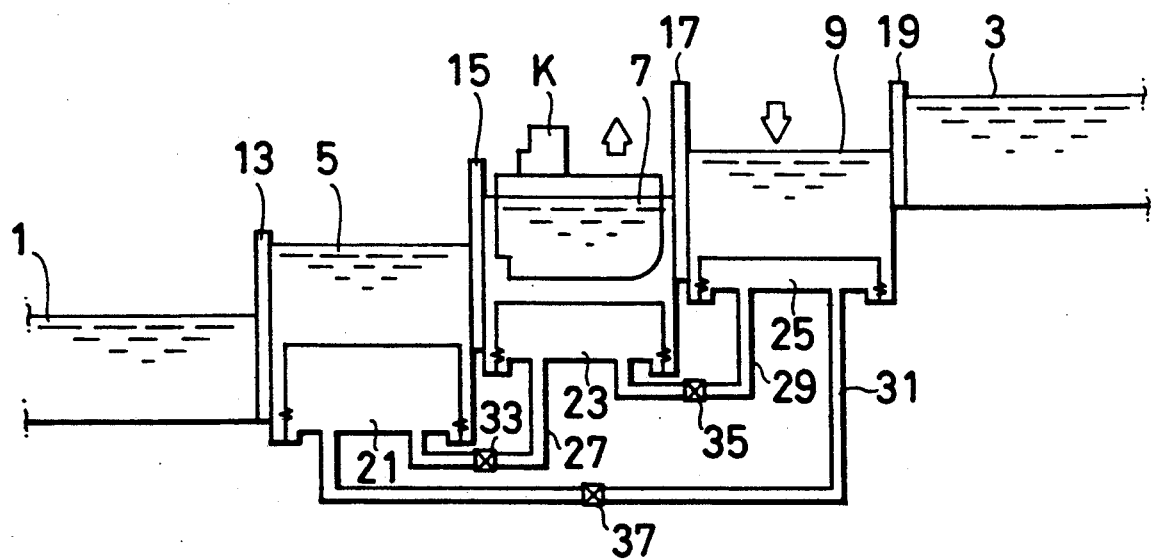

At this point, the second valve 35 is opened such that the air in the upper air chamber 25 flows into the middle air chamber 23 through the second pipe 29. As a result, the water level of the middle lock chamber 7 is raised while the water level of the upper lock chamber 9 is lowered, as shown in FIG. 3(D).

Figure 3E:
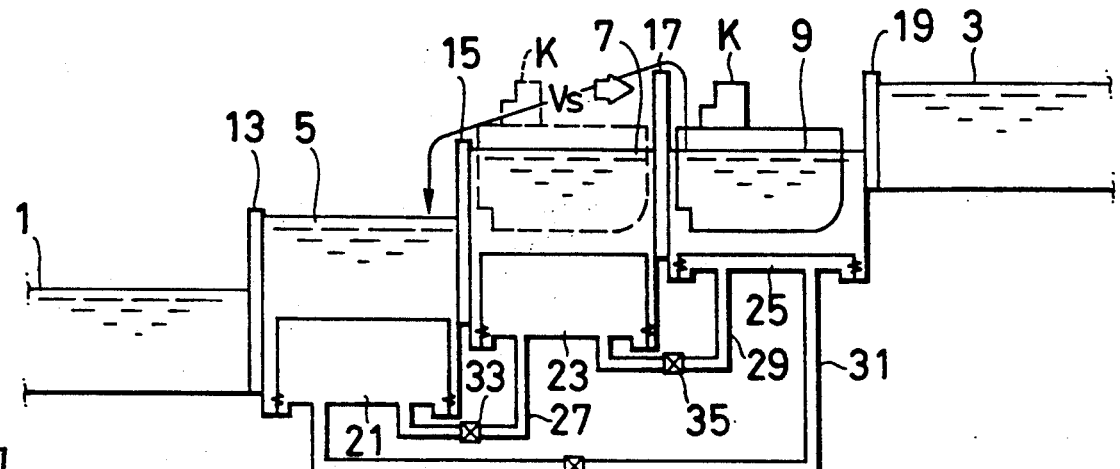

Next, as shown in FIG. 3(E), the second valve 35 is closed, and the surcharge water Vs is discharged from the upper lock chamber 9 to the lower lock chamber 5, such that the water levels of the middle lock chamber 7 and the upper lock chamber 9 are at the same level. Then, the upper lock gate 17 is opened, the boat K is lead from the middle lock chamber 7 to the upper lock chamber 9, and the upper lock gate 17 is closed. Here, the water depth of the upper lock chamber 9 is H1, while the water depth of the lower lock chamber 5 is H1+hs.

Figure 3F:
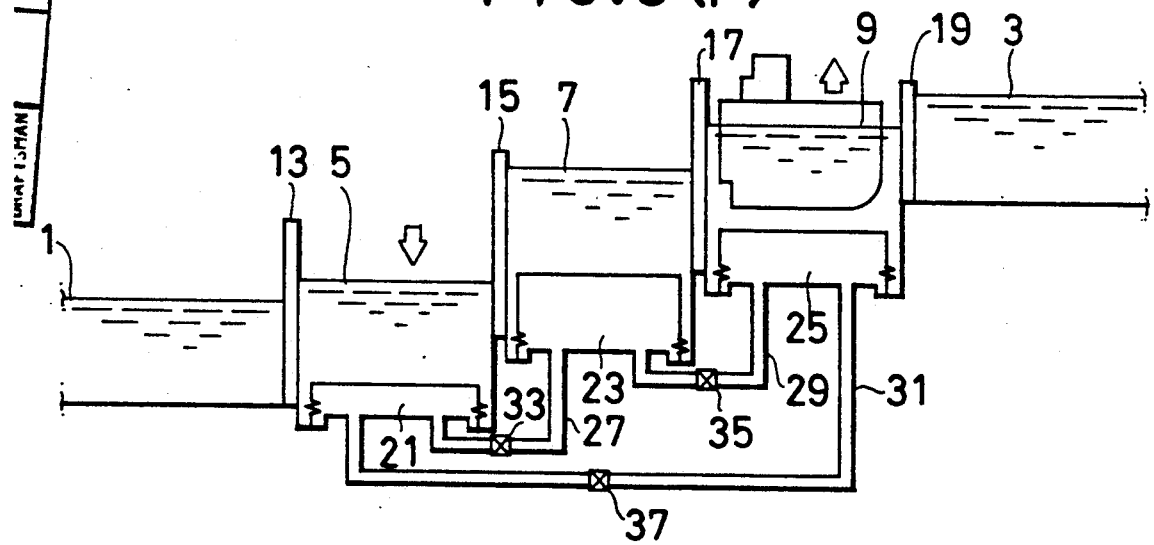

At this point, the third valve 37 is opened such that the air in the lower air chamber 21 flows into the upper air chamber 25 through the third pipe 31. As a result, the water level of the upper lock chamber 9 is raised while the water level of the lower lock chamber 5 is lowered, as shown in FIG. 3(F).

Figure 3G:
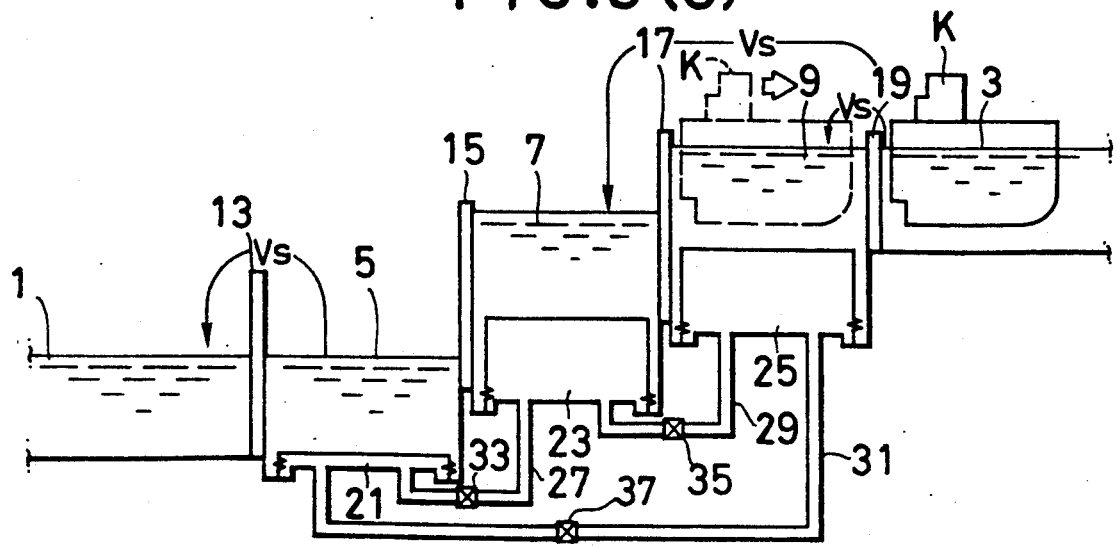

Next, as shown in FIG. 3(G), the third valve 37 is closed, and the surcharge water Vs is supplied from the upper stream 3 to the upper lock chamber 9, such that the water levels of the upper lock chamber 9 and the upper stream 3 are at the same level. Then, the front gate 19 is opened, the boat K is lead from the upper lock chamber 9 to the upper stream 3, and the front gate 19 is closed. Then, the surcharge water Vs is discharged from the lower lock chamber 5 to the lower stream 1, while the surcharge water Vs is supplied from the upper stream 3 to the middle lock chamber 7, so as to resume the initial situation of FIG. 3(A) with the boat K on the upper stream 3 instead of the lower stream 1.

On the other hand, a boat K on the upper stream 3 can be lowered to the lower stream 1 as follows.

Figure 4A:
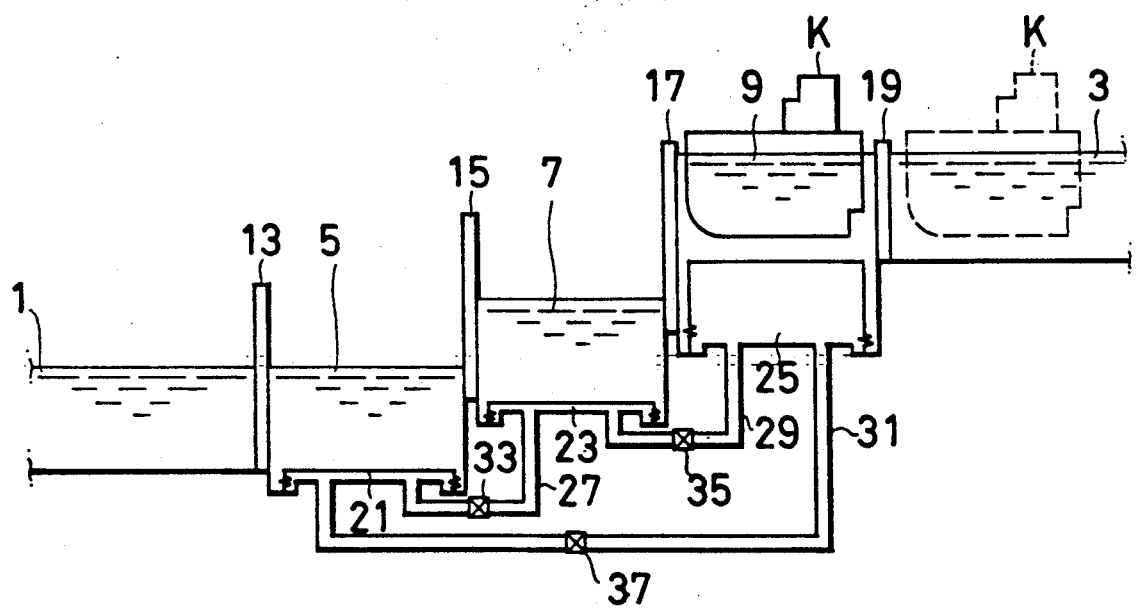
FIG. 4(A) to 4(G) are another sequential longitudinal sectional views of a lock of FIG. 2 for explaining its operation.

First, as shown in FIG. 4(A), the front gate 19 is opened, the boat K is lead from the upper stream 3 to the upper lock chamber 9, and then the front gate 19 is closed. Here, the water depth of the middle lock chamber 7 is H1, while the water depth of the upper lock chamber 9 is H1+hs.

Figure 4B:
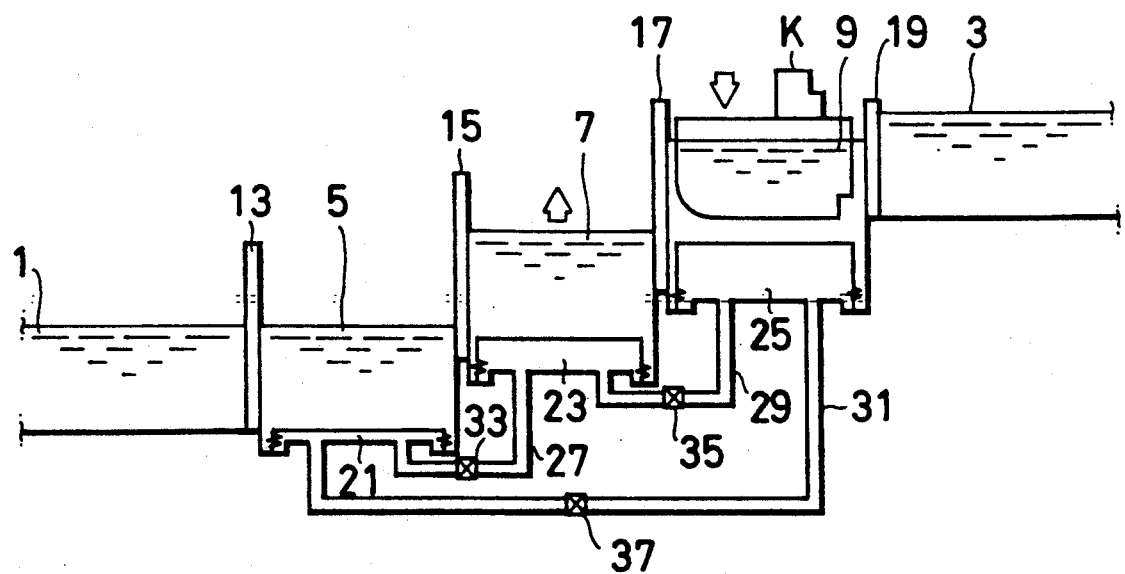

At this point, the second valve 35 is opened such that the air in the upper air chamber 25 flows into the middle air chamber 23 through the second pipe 29. As a result, the water level of the middle lock chamber 7 is raised while the water level of the upper lock chamber 9 is lowered, as shown in FIG. 4(B).

Figure 4C:
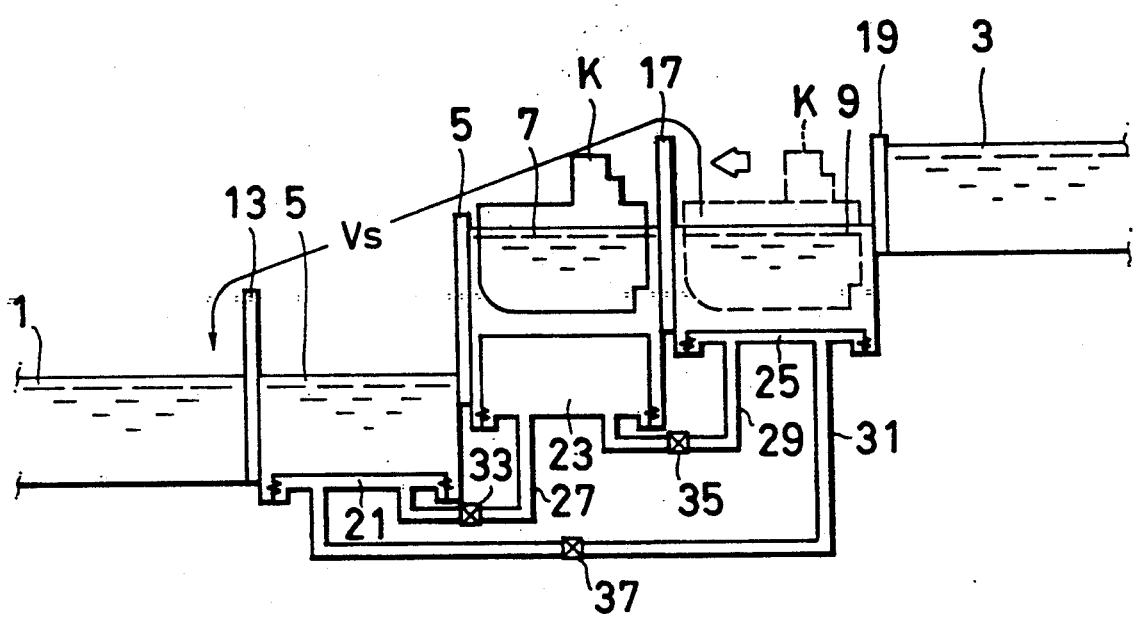

Next, as shown in FIG. 4(C), the second valve 35 is closed, and the surcharge water Vs is discharged from the upper lock chamber 9 to the lower stream 1, such that the water levels of the upper lock chamber 9 and the middle lock chamber 7 are at the same level. Then, the upper lock gate 17 is opened, the boat K is lead from the upper lock chamber 9 to the middle lock chamber 7, then the upper lock gate 17 is closed, and the surcharge water Vs is supplied from the upper stream 3 to the middle lock chamber 7. Here, the water depth of the lower lock chamber 5 is H1, while the water depth of the middle lock chamber 7 is H1+hs.

Figure 4D:
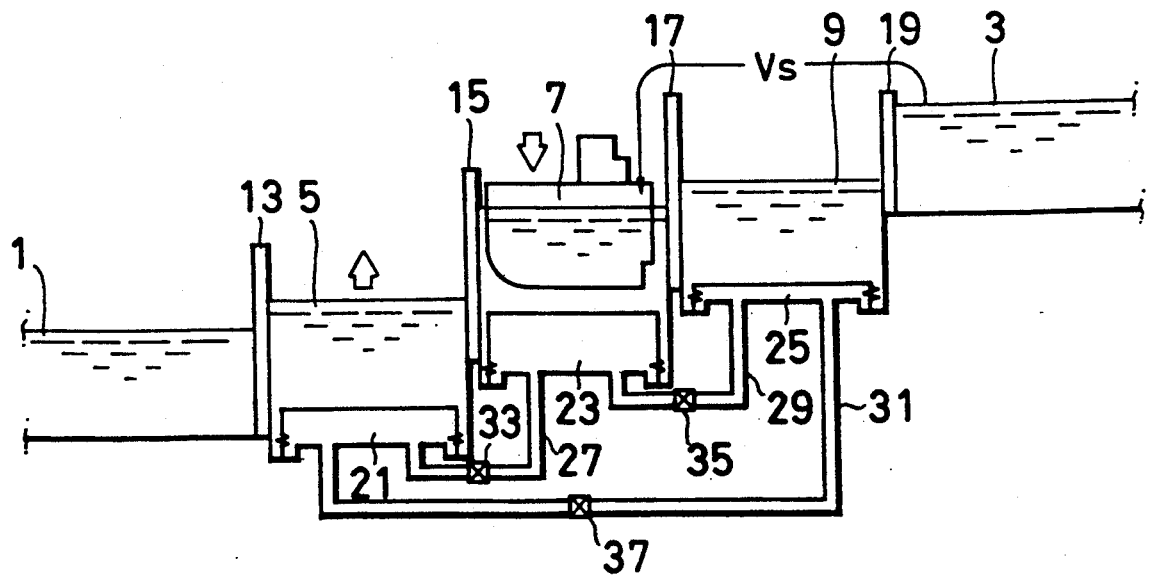

At this point, the first valve 33 is opened such that the air in the middle air chamber flows into the lower air chamber 21 through the first pipe 27. As a result, the water level of the lower lock chamber 5 is raised while the water level of the middle lock chamber 7 is lowered, as shown in FIG. 4(D).

Figure 4E:
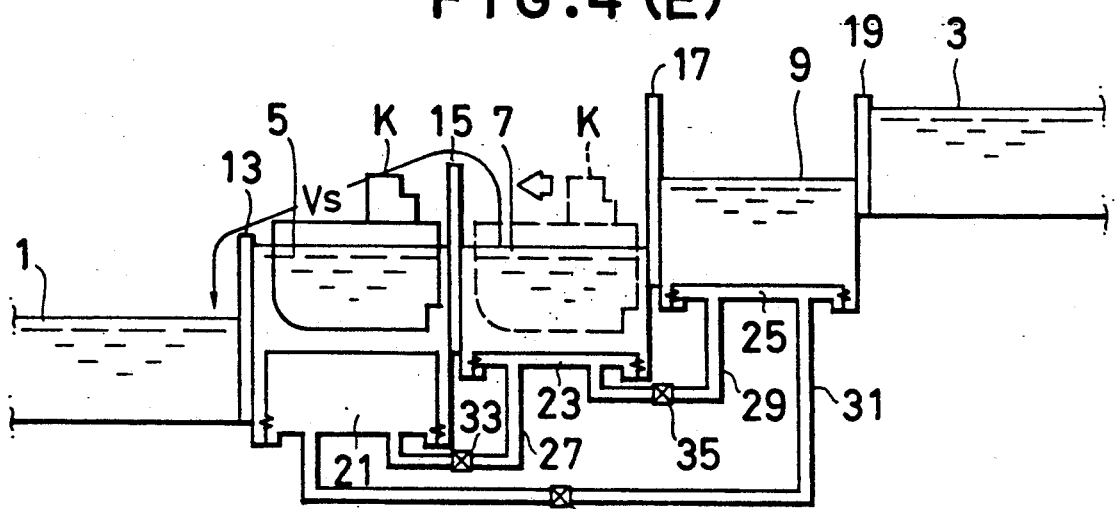

Next, as shown in FIG. 4(E), the first valve 33 is closed, and the surcharge water Vs is discharged from the middle lock chamber 7 to the lower stream 1, such that the water levels of the middle lock chamber 7 and the lower lock chamber 5 are at the same level. Then, the middle lock gate 15 is opened, the boat K is lead from the middle lock chamber 7 to the lower lock chamber 5, and the middle lock gate 15 is closed.

Figure 4F:
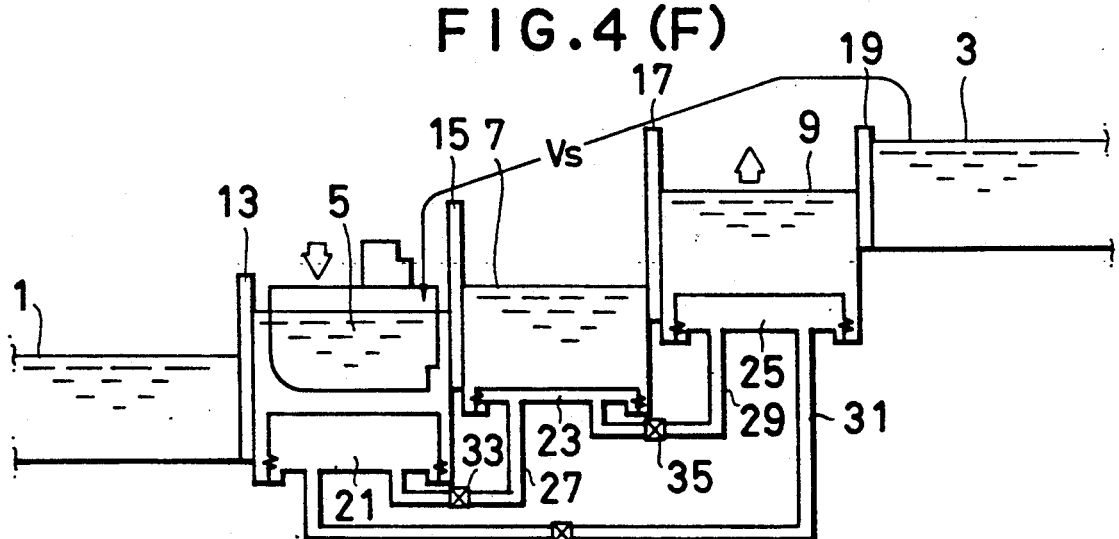

Then, the surcharge water Vs is supplied from the upper stream 3 to the lower lock chamber 5, as shown in FIG. 4(F). Here, the water depth of the upper lock chamber 9 is H1, while the water depth of the lower lock chamber 5 is H1+hs.

At this point, the third valve 37 is opened such that the air in the lower air chamber 21 flows into the upper air chamber 25 through the third pipe 31. As a result, the water level of the upper lock chamber 9 is raised while the water level of the lower lock chamber 5 is lowered, as shown in FIG. 4(F).

Figure 4G:
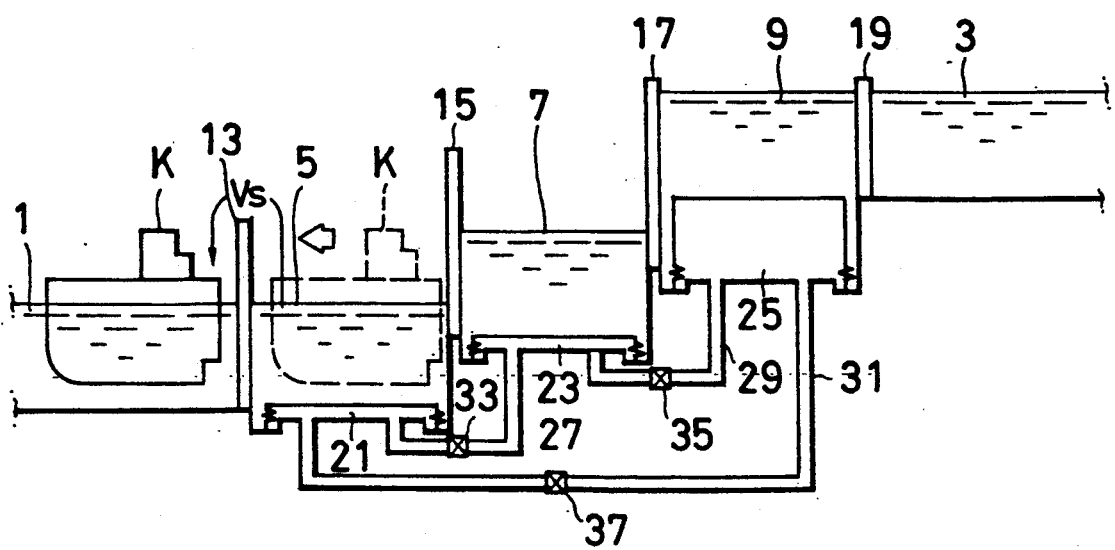

Next, as shown in FIG. 4(G), the third valve 37 is closed, and the surcharge water Vs is discharged from the lower lock chamber 5 to the lower stream 1, such that the water levels of the lower lock chamber 5 and the lower stream 1 are at the same level. Then, the lower lock gate 13 is opened, the boat K is lead from the lower lock chamber 5 to the lower stream 1, and the lower lock gate 13 is closed. Then, the surcharge water Vs is supplied from the upper stream 3 to the upper lock chamber 9, so as to resume the initial situation of FIG. 4(A) with the boat K on the lower stream 1 instead of the upper stream 3.

Thus, in raising the boat K from the lower stream 1 to the upper stream 3, the water corresponding to the displacement of the boat K is transferred from the upper stream 3 to the lower stream 1, and twice of the surcharge water Vs used in activating the lower, middle, and upper air chambers 21, 23, and 25 is to be supplied from the upper stream 3.

Similarly, in lowering the boat K from the upper stream 3 to the lower stream 1, the water corresponding to the displacement of the boat K is transferred from the lower stream 1 to the upper stream 3, and and three times of the surcharge water Vs used in activating the lower, middle, and upper air chambers 21, 23, and 25 is to be supplied from the upper stream 3.

Accordingly, considering an entire operation as consisting of going from the lower stream 1 to the upper stream 3 and then returning back to the lower stream 1, the amount of water consumption for the entire operation is only five times of the surcharge water Vs. This implies that, assuming the surcharge water depth of 20 cm, the reduction of the water consumption to one tenth of the current level is possible for the Panama canal.

Figure 5:
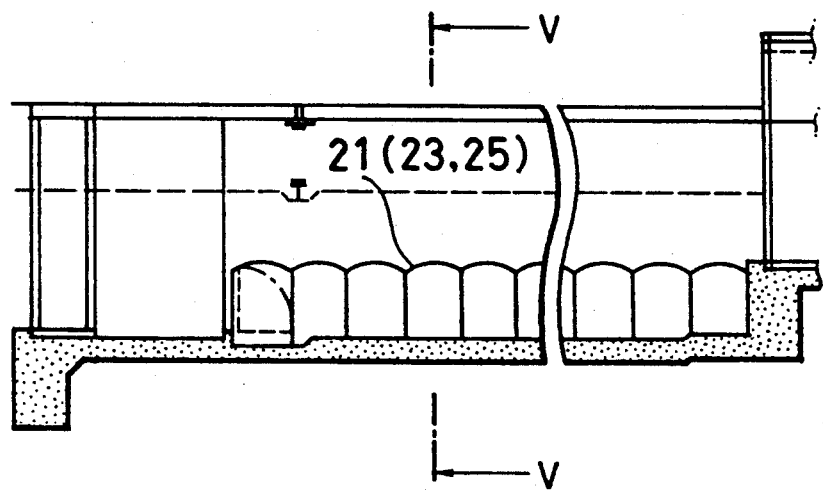
FIG. 5 is an enlarged longitudinal sectional view of one lock chamber in the lock of FIG. 2.
Figure 6:
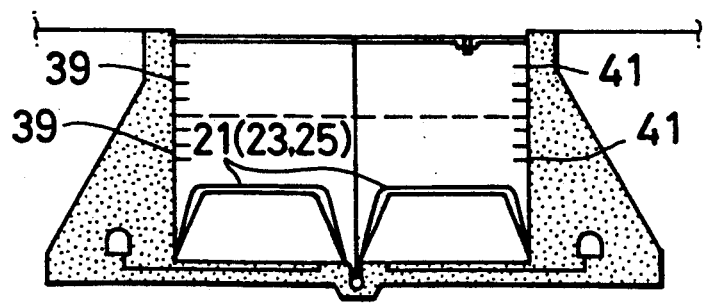
FIG. 6 is a transverse sectional view of one lock chamber in the lock of FIG. 2.

Referring now to FIGS. 5 and 6, there is shown one variation of the above embodiment of a lock according to the present invention.

In this variation, each one of the air chambers 21, 23, and 25 comprises a plurality of flexible air cells arranged in series as shown in FIG. 5. Here, more than one rows of the air cells may be provided for each one of the air chambers 21, 23, and 25, as in FIG. 6 showing a cross section at V—V plane in FIG. 5 in which two rows of the air cells are shown.

With this configuration of the air chambers 21, 23, and 25, it becomes easier for the air chambers 21, 23, and 25 to maintain their overall shapes.

Moreover, by making the air cells of each one of the air chambers 21, 23, and 25 completely separated from each other and capable of being activated independently, it becomes possible to make the air chambers 21, 23, and 25 safer because the air chambers 21, 23, and 25 as a whole can continue to function even when one of the air cell is disabled.

Furthermore, with this configuration of the air chambers 21, 23, and 25, it becomes possible to disperse a buoyancy exerted on each one of the air chambers 21, 23, and 25 over an entire base of the respective lock chamber.

In addition, as shown in FIG. 6, each lock chamber may be equipped with vertically lined light sources 39 on one side wall and vertically lined sensors 41 on an opposite side wall, such that an extent of inflation or deflation of the air chambers 21, 23, and 25 can be monitored. The supply of the air to the air chambers 21, 23, and 25 may be controlled in accordance with the extent of inflation or deflation thus monitored.

It is to be noted that although the inflation and deflation of the air chambers are activated by means of the surcharge water in the above embodiment, this feature may be replaced by a pump system for transferring the air between the air chambers.

Figure 7A:
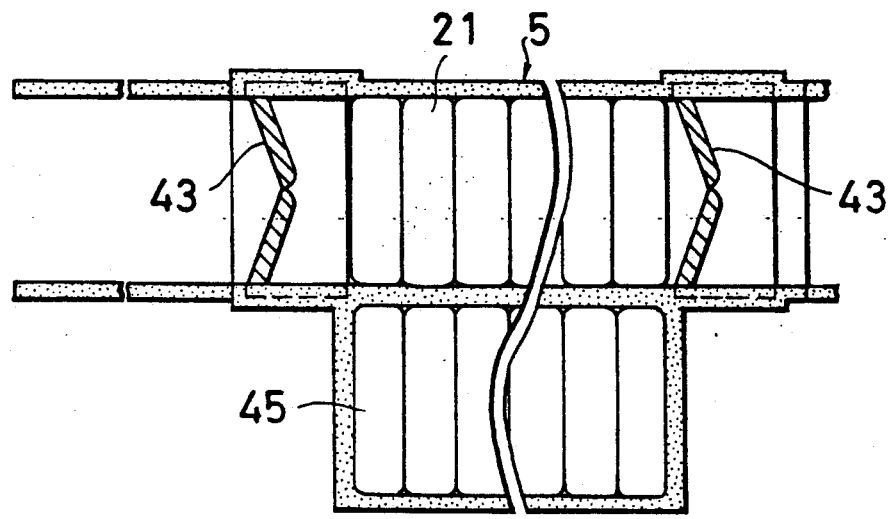
FIG. 7(A) is a top plan view of one variation for one step lock in the lock of FIG. 2.
Figure 7B:
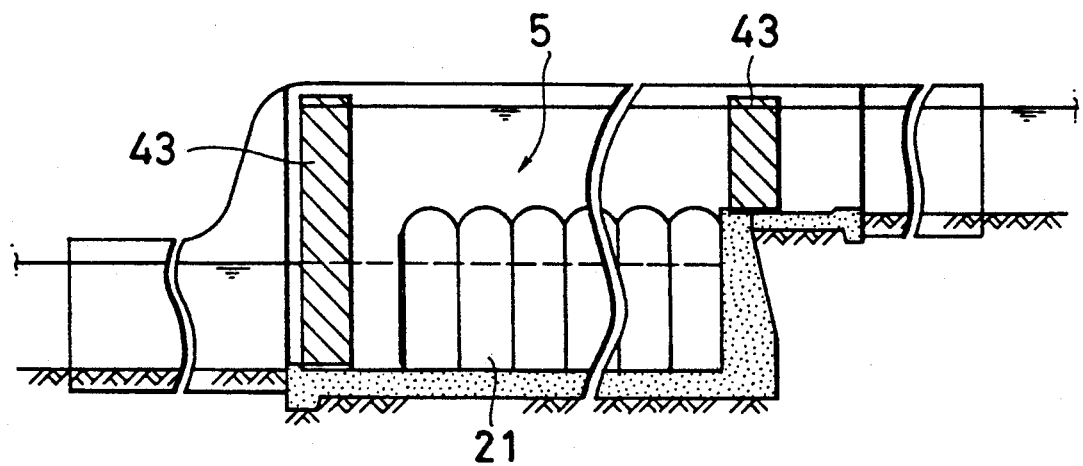
FIG. 7(B) is a longitudinal sectional view of one variation for one step lock in the lock of FIG. 2.
Figure 7C:
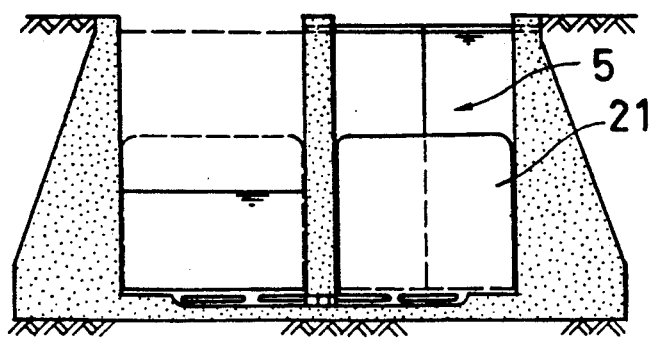
FIG. 7(C) is a transverse sectional view of one variation for one step lock in the lock of FIG. 2.

Also, although the lock using three lock chambers has been described in the above embodiment as a representative example of the lock using more than one lock chambers, the present invention is equally applicable to a case involving only one lock chamber, as shown in FIGS. 7(A), 7(B), and 7(C).

In FIGS. 7(A), 7(B) and 7(C), there is only one lock chamber 5 which has two miter gates 43 on its two ends. The lock chamber 5 is equipped with the air chamber 21 which comprises one row of air cells.

In addition, next to the lock chamber 5, there is provided a balance air chamber 45 to be inflated or deflated in conjunction with the deflation or inflation, respectively, of the air chamber 21 of the lock chamber 5. In other words, the air chamber 21 is inflated by deflating the balance air chamber 45, while the air chamber 21 is deflated by inflating the balance air chamber 45, both of which can be achieved by controlling the flow of the air between the air chamber 21 and the balance air chamber 45.

Besides these, many modifications and variations of the above embodiment may be made without departing from the novel and advantageous features of the present invention. Accordingly, all such modifications and variations are intended to be included within the scope of the appended claims.

What is claimed is:

1. A lock for connecting an upper stream and a lower stream, comprising:
    an upper lock chamber containing water, located adjacent to the upper stream;
    a first flexible air chamber capable of being inflated with air, located on a base of the upper lock chamber;
    a lower lock chamber containing water, located between the upper lock chamber and the lower stream, the upper lock chamber and the lower lock chamber being capable of transferring a surcharge water therebetween;
    a second flexible air chamber capable of being inflated with air, located on a base of the lower lock chamber; and
    pipe means for connecting the first air chamber and the second air chamber, equipped with valve means for controlling a flow of air between the first air chamber and the second air chamber, such that the first air chamber is inflated while the second air chamber is deflated, and the first air chamber is deflated while the second air chamber is inflated, where the inflation and deflation of the first air chamber and the second air chamber are activated by weight difference of the waters contained in the upper lock chamber and the lower lock chamber which is produced by a transfer of the surcharge water between the upper lock chamber and the lower lock chamber.

2. The lock of claim 1, wherein the inflation of the first air chamber and the second air chamber are activated by pump means for transferring air between the first air chamber and the second air chamber.

3. The lock of claim 1, wherein a boat is passed from the upper stream to the lower stream through the lock, by first leading the boat from the upper stream into the upper lock chamber when a water level inside the upper lock chamber is equal to a water level of the upper stream, next deflating the first air chamber while inflating the second air chamber until water levels inside the upper lock chamber and the lower lock chamber become equal, next leading the boat from the upper lock chamber into the lower lock chamber, next inflating the first air chamber while deflating the second air chamber until a water level inside the lower lock chamber becomes equal to a water level of the lower stream, and then leading the boat from the lower lock chamber to the lower stream.

4. The lock of claim 1, wherein a boat is passed from the lower stream to the upper stream through the lock, by first leading the boat from the lower stream into the lower lock chamber when a water level inside the lower lock chamber is equal to a water level of the lower stream, next deflating the first air chamber while inflating the second air chamber until water levels inside the upper lock chamber and the lower lock chamber become equal, next leading the boat from the lower lock chamber into the upper lock chamber, next inflating the first air chamber while deflating the second air chamber until a water level inside the upper lock chamber becomes equal to a water level of the upper stream, and then leading the boat from the upper lock chamber to the upper stream.

5. The lock of claim 1, further comprising:
    at least one middle chambers containing water, located between the upper lock chamber and the lower lock chamber; and
    additional air chambers capable of being inflated with air, located on bases of each middle chamber; and
    wherein the pipe means also connects the middle chambers with the first air chamber and the second air chamber as well as with each other, and the valve means also controls flows of air among the middle chambers, the first air chambers, and the second air chamber.

6. The lock of claim 1, wherein each of the first air chamber and the second air chamber comprises a plurality of air cells arranged in series.

7. The lock of claim 6, wherein the air cells are completely separated from each other and capable of being activated independently.

8. The lock of claim 6, wherein the air cells are arranged in more than one rows.

9. The lock of claim 1, wherein each of the upper lock chamber and the lower lock chamber is equipped with vertically lined light sources on one side wall and vertically lined sensors on an opposite side wall, in order to detect an extent of inflation of one of the first air chamber and the second air chamber located inside.

10. A lock for connecting an upper stream and a lower stream, comprising:
    a lock chamber containing water, located between the upper stream and the lower stream;
    an air chamber capable of being inflated with air, located on a base of the lock chamber;
    a balance lock chamber containing water, located outside of the lock chamber, the lock chamber and the balance lock chamber being capable of transferring a surcharge water therebetween;
    a balance air chamber capable of being inflated with air, located on a base of the balance lock chamber; and
    pipe means for connecting the air chamber and the balance air chamber, equipped with valve means for controlling a flow of air between the air chamber and the balance air chamber, such that the air chamber is inflated while the balance air chamber is deflated, and the air chamber is deflated while the balance air chamber is inflated, where the inflation and deflation of the air chamber and the balance air chamber are activated by weight difference of the waters contained in the lock chamber and the balance lock chamber which is produced by a transfer of the surcharge water between the lock chamber and the balance lock chamber.

11. The lock of claim 10, wherein the inflation of the air chamber and the balance air chamber are activated by pump means for transferring air between the air chamber and the balance air chamber.

12. The lock of claim 10, wherein each of the first air chamber and the second air chamber comprises a plurality of air cells arranged in series.

13. The lock of claim 12, wherein the air cells are completely separated from each other and capable of being activated independently.

14. The lock of claim 12, wherein the air cells are arranged in more than one rows.

15. The lock of claim 10, wherein each of the upper lock chamber and the lower lock chamber is equipped with vertically lined light sources on one side wall and vertically lined sensors on an opposite side wall, in order to detect an extent of inflation of one of the first air chamber and the second air chamber located inside.

16. A lock for connecting an upper stream and a lower stream, comprising:
- an upper lock chamber containing water, located adjacent to the upper stream;
- a first flexible air chamber capable of being inflated with air, located on a base of the upper lock chamber;
- a lower lock chamber containing water, located between the upper lock chamber and the lower stream;
- a second flexible air chamber capable of being inflated with air, located on a base of the lower lock chamber; and
- pipe means for connecting the first air chamber and the second air chamber, equipped with valve means for controlling a flow of air between the first air chamber and the second air chamber,
- wherein each of the upper lock chamber and the lower lock chamber is equipped with vertically lined light sources on one side wall and vertically lined sensors on an opposite side wall, in order to detect an extent of inflation of one of the first air chamber and the second air chamber located inside.

17. A lock for connecting an upper stream and a lower stream, comprising:
- a lock chamber containing water, located between the upper stream and the lower stream;
- an air chamber capable of being inflated with air, located on a base of the lock chamber;
- a balance air chamber capable of being inflated with air, located outside of the lock chamber; and
- pipe means for connecting the air chamber and the balance air chamber, equipped with valve means for controlling a flow of air between the air chamber and the balance air chamber,
- wherein each of the upper lock chamber and the lower lock chamber is equipped with vertically lined light sources on one side wall and vertically lined sensors on an opposite side wall, in order to detect an extent of inflation of one of the first air chamber and the second air chamber located inside.

* * * * *

UNITED STATES PATENT AND TRADEMARK OFFICE
CERTIFICATE OF CORRECTION

PATENT NO.   : 5,013,184
DATED        : May 7, 1991
INVENTOR(S)  : Toshikatsu Omachi It is certified that error appears in the above-identified patent and that said Letters Patent is hereby corrected as shown below:

Column 3    line 58, change "inflation of deflation" to --inflation or deflation--;

Column 4    line 31, after "lock gate" and before "is closed." insert --15--;

Column 5    line 30, after "air chamber" and before "flows" insert --23--.

Signed and Sealed this

First Day of June, 1993

Attest:

MICHAEL K. KIRK

Attesting Officer         Acting Commissioner of Patents and Trademarks